United States Patent [19]

Shiba et al.

[11] Patent Number: 4,688,128
[45] Date of Patent: Aug. 18, 1987

[54] MAGNETIC TAPE CASSETTE HAVING TWO LAYERED PORTIONS

[75] Inventors: Haruo Shiba, Komoro; Takateru Sato, Saku; Kimio Tanaka, Saku; Yoshiya Sakata, Saku, all of Japan

[73] Assignee: TDK Corporation, Tokyo, Japan

[21] Appl. No.: 825,997

[22] Filed: Feb. 4, 1986

[30] Foreign Application Priority Data

Feb. 15, 1985 [JP] Japan .................. 60-020826[U]

[51] Int. Cl.$^4$ ............................................ G11B 23/087
[52] U.S. Cl. .................................................... 360/132
[58] Field of Search ..................... 360/132; 242/198

[56] References Cited

U.S. PATENT DOCUMENTS

| 3,796,394 | 3/1974 | Souza | 360/132 |
| 4,466,585 | 8/1984 | Maehara | 360/132 |
| 4,545,483 | 10/1985 | Shiba et al. | 360/132 |
| 4,560,117 | 12/1985 | Shimizu | 360/132 |

Primary Examiner—Robert S. Tupper
Attorney, Agent, or Firm—Oblon, Fisher, Spivak, McClelland & Maier

[57] ABSTRACT

In a magnetic tape cassette comprising upper and lower half casings, at least screw-fastening portions and their neighboring portions at four corners of the upper and lower half casings are formed by a two-layered structure consisting of the first layer of an opaquelayer, a transparent layer or a semitransparent layer and the second layer of a transparent layer or a semitransparent layer which is laminated on the first layer in one piece.

10 Claims, 14 Drawing Figures

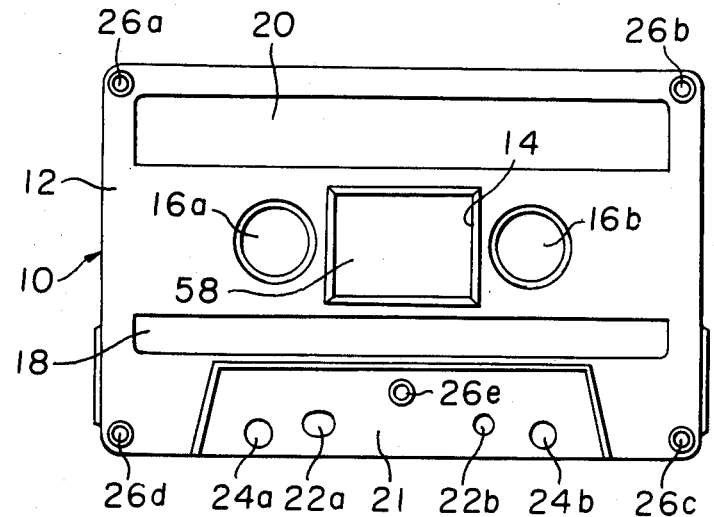
FIGURE 2A PRIOR ART
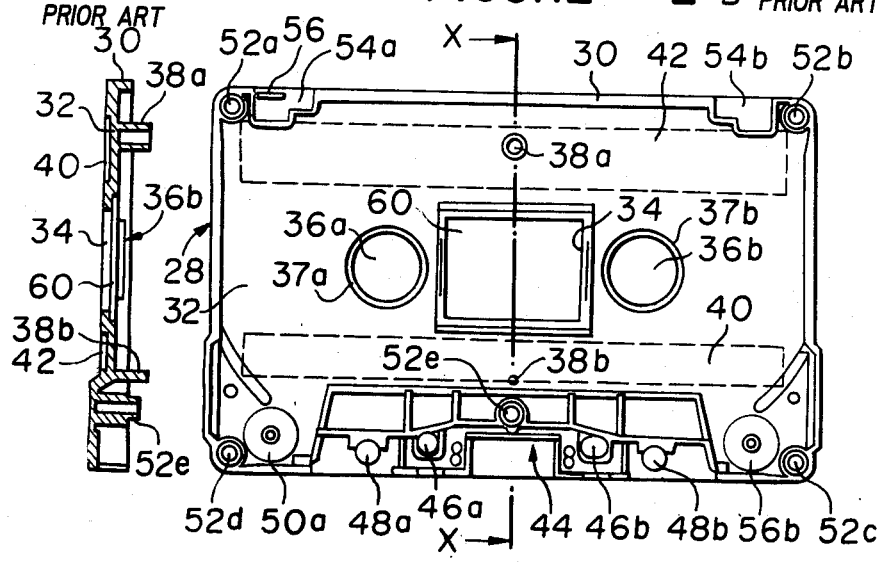
FIGURE 2C PRIOR ART
FIGURE 2B PRIOR ART

FIGURE 3A PRIOR ART
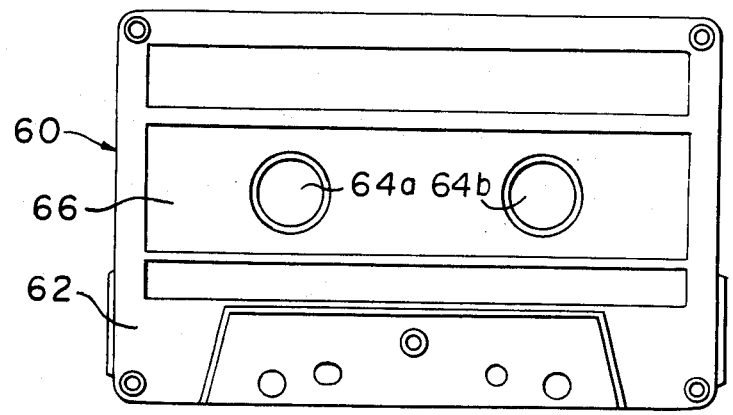
FIGURE 3C PRIOR ART
FIGURE 3B PRIOR ART
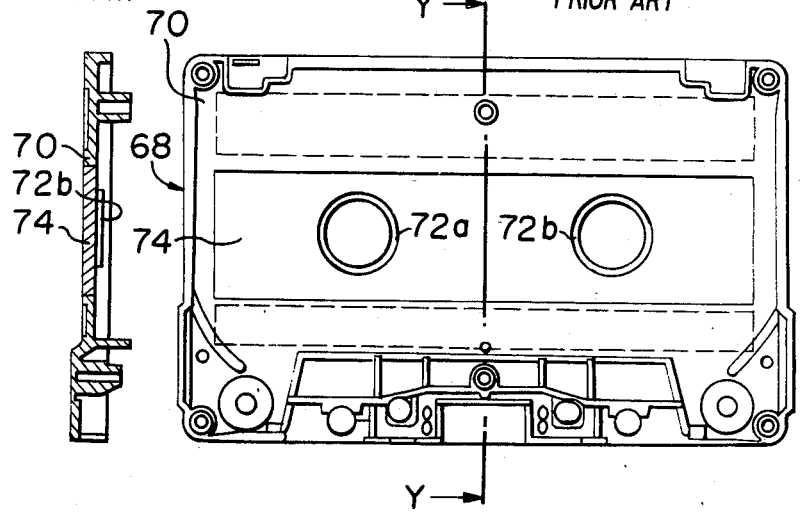

MAGNETIC TAPE CASSETTE HAVING TWO LAYERED PORTIONS

BACKGROUND OF THE INVENTION

1. FIELD OF THE INVENTION

The present invention relates to a casing for a magnetic tape cassette used for an audio system or a video system.

2. DESCRIPTION OF THE PRIOR ART

A casing for a magnetic tape cassette for an audio system or a video system has been prepared by molding to form a single or two-colored, single-layered structure.

FIG. 2 shows an audio magnetic tape cassette having a single colored, single-layered structure, in which FIG. 2A is a plan view of the outer surface side of an upper half casing; FIG. 2B is a plan view of the inner surface side of a lower half casing; and FIG. 2C is a cross-sectional view taken along a line X—X of the lower half casing. In FIG. 2, a reference numeral 10 designates an upper half casing consisting generally of a rectangular upper surface plate 12 around which vertical side walls having substantially uniform height (not shown) are formed. The upper surface plate 12 is provided with a rectangular tape-quantity observing window 14 at its central portion and a pair of reel driving shaft insertion holes 16a, 16b at a symmetrical position of right and left sides of the window 14. Generally, recesses 18, 20 for labelling areas to show A or B surface and other information in an elongated form extending in the right and left directions are provided in the upper and lower portions of the window 14. The upper surface plate 12 is further provided with a table-shaped projection 21 at the front side in the central portion to form a front opening part, a pair of cassette position determining holes 22a, 22b at right and left sides of the front opening part in a symmetrical manner, and a pair of capstan insertion holes 24a, 24b at a symmetrical position on either side of the cassette position determining holes 22a, 22b. Screw fastening holes 26a–26d are formed at four corners of the upper surface plate 12 and a screw fastening hole 26e is formed at the front side of the window 14 in the upper surface plate 12. Each of the screw fastening holes is provided with a countersink for receiving the head portion of a screw.

A lower half casing 28 comprises a rectangular bottom surface plate 32 having vertical side walls 30 of substantially uniform height. The bottom surface plate 32 is provided with a rectangular tape-quantity observing window 34 at the central portion and a pair of reel driving shaft insertion holes 36a, 36b at symmetrical positions at right and left sides of the window 34. There are respectively formed hub controlling ribs 37a, 37b around the reel driving shaft insertion holes 36a, 36b, lining sheet position determining pins 38a, 38b at symmetrical positions in the vertical direction of the window 34, and recesses 40, 42 for labelling areas to show A or B surface and other information of an elongated form extending in the right and left directions, the recesses being formed in the outer surface at upper and lower portions of the window 34. The lining sheet position determining pins 38a are in a cylindrical form so as to increase rigidity of the lower half casing whereby twisting or curving of the casing can be avoided. A central opening portion 44 is formed at the front side of the central portion of the bottom surface plate 32. A pad supporting means is provided near the central opening portion 44. At symmetrical positions of both sides of the central opening portion 44, there are formed a pair of cassette position determining holes 46a, 46b, a pair of capstan insertion holes 48a, 48b, and a pair of recesses for receiving tape guiding roller shafts 50a, 50b, respectively. Cylindrical projections for screw fastening 52a–52e are formed at four corners and at the front side in the central portion of the bottom surface plate 32, numerals 54a, 54b designate recesses for prevention of erroneous erasing which are provided at symmetrical positions of right and left sides of the inner portion of the bottom surface plate 32, and a numeral 56 designates a pawl formed in each of the recesses.

The upper and lower half casings 10, 28 are respectively formed by injection-molding of a material such as styrol resin. The upper and lower half casings 10, 28 are respectively opaque or transparent in a single color (generally in black) and have a single-layered structure. Each of the windows 14, 34 of the upper and lower half casings 10, 28 is attached with a transparent or semitransparent plastic plate 56 or 60 of polyethylene terephthalate (PET), polypropylene (PP), hard vinyl chloride (PVC) and so on after the injection-molding. The magnetic tape cassette is assembled by receiving a magnetic tape wound on hubs and other elements in a space formed by matching the upper and lower half casings 10, 28, and by fastening the half casings with tapping screws, the screw fastening portions being formed at four corners and at the front sides of the central portion of the upper and bottom surface plates 12, 34. Namely, the screw fastening holes 26 and the cylindrical projections for screw fastening 52 are fastened by screws.

FIG. 3 shows a two-colored, single-layered audio magnetic tape cassette casing, in which FIG. 3A is a plan view showing the outer surface of an upper half casing; FIG. 3B is a plan view showing the inner surface of a lower half casing; and FIG. 3C is a cross-sectional view taken along a line Y-Y in FIG. 3B. As apparent from FIGS. 2 and 3, the construction of the single colored, single-layered audio magnetic tape cassette casing is identical with that of the two-colored, single-layered one except for the construction of the window. In FIG. 3, a reference numeral 60 designates an upper half casing; a numeral 62 designates an upper surface plate; numerals 64a, 64b designate a pair of reel driving shaft insertion holes formed at a symmetrical position with respect to the vertical center line (not shown) of the upper surface plate 62 in FIG. 3A; a numeral 66 designates a tape-quantity observing window which includes the holes 64a, 64b and extends in the right and left directions in an elongated form.

A reference numeral 68 designates a lower half casing; a numeral 70 designates a bottom surface plate; numerals 72a, 72b designate a pair of reel driving shaft insertion holes formed at a symmetrical position with respect to the center line of the bottom surface plate 70 in FIG. 3B; and a numeral 74 designates a tape-quantity observing window which includes the reel driving shaft insertion holes 72a, 72b and extends in the right and left directions in an elongated form. The upper and lower half casings 60, 68 have respectively a two-colored, single-layered structure in which the windows 66, 74 are formed by injection-molding of transparent or semitransparent plastic resin and the other portion is formed by injection-molding of opaque plastic resin (generally in black) so that the transparent or semitransparent portion is integrally jointed to the opaque portion.

In the conventional magnetic tape cassette, the upper and lower casings must respectively be complicated in shape and construction to satisfactorily attain function of the magnetic tape cassette, and they are formed by molding a resinous material into a one-piece body. Accordingly, there are various projections, recesses and portions having different thickness in the upper and bottom surface plates of the both half casings. In a resinous product formed by injection-molding, the curing speed in a thin-walled portion is faster than that in a thick-walled portion. Therefore, a concave is produced in the vicinity of the thick-walled portion contiguous to the thin-walled portion due to shrinkage caused at the time of curing of the resin immediately after the injection-molding.

FIG. 4 is a cross-sectional view of the upper left portion of the lower half casing shown in FIG. 2B or FIG. 3B, in which a concave 76 is produced at the portion between the thick-walled portion where a cylindrical projection 52a for receiving a screw is formed and the recess for prevention of erroneous erasing 54a as a thin-walled portion contiguous to the thick-walled portion. When such concave is produced, flatness in a reference surface required for the half casings and other portions is impaired thereby causing irregular running of a magnetic tape. Further, there results a reduction in appearance of the casings due to poor glossiness.

SUMMARY OF THE INVENTION

It is an object of the present invention to provide a magnetic tape cassette capable of increasing flatness and glossiness of the half casings and being excellent in design by avoiding production of concaves which are apt to take place in screw fastening portions at four corners of the casings and thereround.

The foregoing and the other objects of the present invention have been attained by providing a magnetic tape cassette comprising upper and lower half casings characterized in that at least screw-fastening portions and their neighboring portions at four corners of the upper and lower half casings are formed by a two-layered structure consisting of the first layer of an opaque layer, a transparent layer or a semitransparent layer and the second layer of a transparent layer or a semitransparent layer which is laminated on the first layer in one piece.

In the present invention, as an opaque material which forms an opaque layer of the first layer, acrylonitrile butadienestyrene (ABS) resin, high impact styrol resin and other suitable material may be used. As a material which forms a transparent layer or a semitransparent layer of the first and second layers, polystyrene resin, polypropylene resin, polyester resin, acrylonitrile butadienestyrene (ABS) resin, acrylonitrilestyrene resin, methacryl resin, polycarbonate resin and other suitable resins may be used. A coloring agent such as pigment is incorporated in the transparent resin to form a semitransparent layer. The two-layered structure may be applied not only to the thick-walled portion, i.e. the screw fastening portions and their neighboring portions at four corners of the casings, but also to a desired portion of the thin-walled portion.

BRIEF DESCRIPTION OF THE DRAWINGS

In the drawings:

FIG. 2A is a plan view showing the outer surface of the upper half casing of a conventional single-colored, single-layered audio magnetic tape cassette;

FIG. 2B is a plan view showing the inner surface of the lower half casing of the magnetic tape cassette shown in FIG. 2A;

FIG. 2C is a cross-sectional view taken along a line X—X of the lower half casing in FIG. 2B;

FIG. 3A is a plan view showing the outer surface of the upper half casing of the conventional two-colored, single-layered audio magnetic tape cassette;

FIG. 3B is a plan view showing the inner surface of the lower half casing to be coupled with the upper half casing shown in FIG. 3A;

FIG. 3C is a cross-sectional view taken along a line Y—Y in FIG. 3B;

DETAILED DESCRIPTION OF THE PREFERRED EMBODIMENTS

First of all, basic idea of the present invention will be described with reference to FIG. 1.

Screw fastening portions and their neighboring portions at the four conres of the upper and lower half casings of a magnetic tape cassette are formed to have a two-layered structure in which a transparent or semitransparent second layer 118 is laminated on an opaque, transparent or semitransparent first layer 114. With such two-layered structure, various adjustment can be possible. Namely, even though a concave 116 is produced in a thick-walled portion of a cylindrical projection 108a for fastening a screw or a thin-walled portion contiguous to the thick-walled portion when the first layer 114 is formed by injection-molding, the concave 116 in the first layer 114 is covered by overlap-molding of the second layer 118, whereby accuracy in flatness of a reference surface which is essential to the magnetic tape cassette and other surfaces can be maintained. It is unavoidable that when the upper half casing is formed by injection-molding, a thin-walled portion arises at the outer surface including a curved portion in the range of 90° of the screw fastening portion at each of the four corners of the casing because the screw fastening portion is provided with a countersink, and dimension in the outer configuration of the upper half casing are standardized. To increase strength of the thin-walled corner portions, a material having high strength such as acrylonitrilestyrene resin, methacryl resin, polycarbonate resin and so on is used for a transparent or semitransparent second layer. The second layer prevents occurrence of cracks when the upper half casing is removed from a metal mold and partial deformation caused by a shock of dropping. The second layer covers a gate for injection-molding of the first layer thereby to improve appearance of the half casings, and enables one to provide an excellent design. Further, when a transparent or a semitransparent layer as the second layer 118 is laminated on the first layer 114, glossiness and accuracy in shape of the product can be increased. In addition, three-dimensional effect can be provided by the two-layered structure and selectivity in design can be widened.

Figure 5:
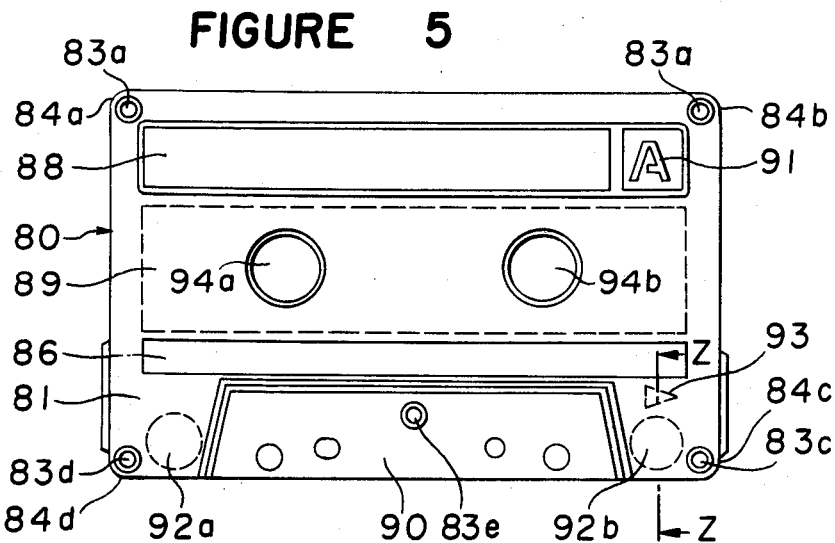
FIG. 5 is a plan view showing the outer surface of the upper half casing of the audio magnetic tape cassette according to an embodiment of the present invention.
Figure 6:
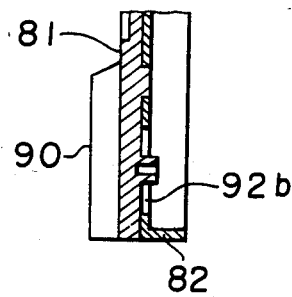
FIG. 6 is an enlarged cross-sectional view taken along line Z—Z in FIG. 5.
Figure 7:
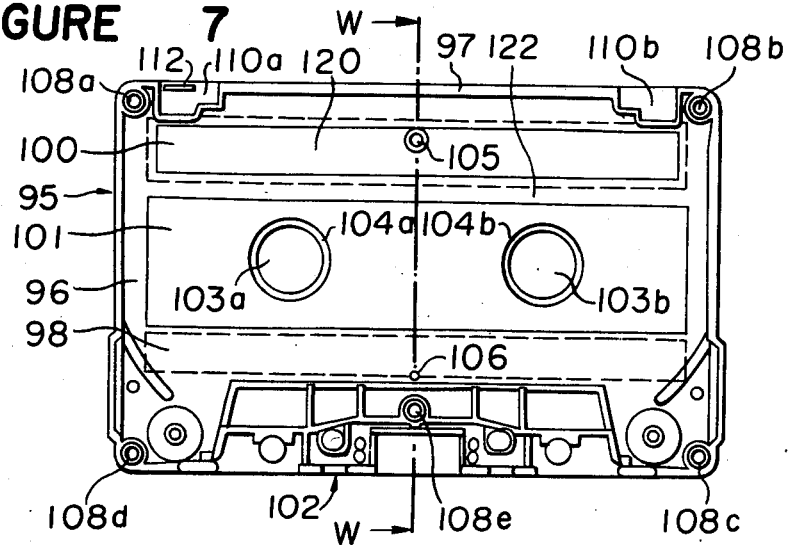
FIG. 7 is a plan view showing the inner surface of the lower half casing to be coupled with the upper half casing shown in FIG. 5.
Figure 8:
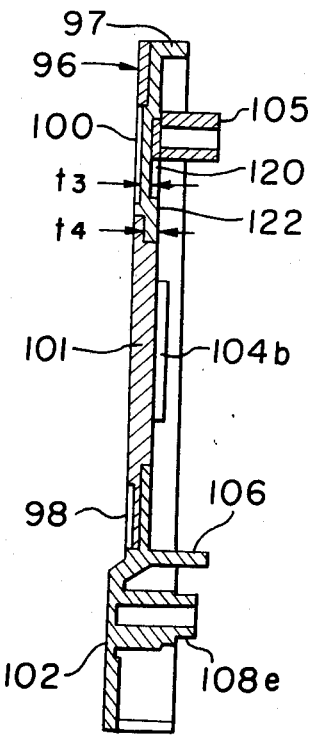
FIG. 8 is an enlarged cross-sectional view taken along a line W—W in FIG. 7.

An embodiment of the present invention will be described with reference to FIGS. 5 to 8. FIG. 5 is a plan view showing the outer surface of the upper half casing of an audio magnetic tape cassette; FIG. 6 is a cross-sectional view taken along a line Z—Z in FIG. 5; FIG. 7 is a plan view showing the inner surface of a lower half casing; and FIG. 8 is an enlarged cross-sectional view taken along a line W—W in FIG. 7.

In comparing of the conventional magnetic tape cassette casing of a two-colored, single-layered structure as shown in FIG. 3 with the magnetic tape cassette casing of the present invention, the upper and lower half casings of the present invention have a two-layered structure in which the second layer of a transparent or a semitransparent layer is laminated on the first layer of an opaque, transparent or semitransparent layer.

In the Figures, a reference numeral 80 designates an upper half casing comprising an upper surface plate 81 and side walls 82 surrounding the circumference of the upper surface plate 81. The upper surface plate 81 is provided with screw fastening holes 83a to 83e at the four corners and at the front side in the central portion. A countersink is formed around the opening of each of the screw fastening holes to receive the head of a screw. Each of the four corners of the upper half casing has a curved portion 84a to 84d. The upper surface plate 81 is provided with recesses 86, 88 for labelling areas to show A or B surface and other information in a elongated form which extends right and left directions in the plate 81, a tape-quantity observing window 89 and a table-shaped projection 90 for forming a front opening part. The upper surface plate 81 is further provided at the right side with an area for discriminating A or B surface 91, (a character A is shown in this embodiment), a pair of circular tape-guiding roller windows 92a, 92b at a symmetrical position of both sides of the table-shaped projection 90 for forming the front opening part, and a triangular tape-running direction indicating window 93 formed between the right side tape-guiding roller window 92b and the front side labelling recess 86. A pair of reel driving shaft insertion holes 94a, 94b are also formed in the upper half casing.

A reference numeral 95 designates a lower half casing comprising a bottom surface plate 96 and side walls 97 surrounding the circumference of the bottom surface plate 96. The construction of the bottom surface plate 96 is substantially the same as that of the upper surface plate 81 of the upper half casing 80 provided that arrangement of the structural elements is symmetrical. Namely, the bottom surface plate 96 is provided with recesses for labelling areas 98, 100, a tape-quantity observing window 101, a table-shaped projection 102 for forming a front opening part, a pair of reel driving shaft insertion holes 103a, 103b, a pair of hub controlling ribs 104a, 104b around the reel-driving shaft insertion holes, lining sheet position determining pins 105, 106, cylindrical projections for screw fastenings 108a to 108e, recesses for prevention of erroneous erasing 110a, 110b and a pawl 112 formed in each of the recesses 110a, 110b. As apparent from FIGS. 6 and 8, the upper and lower half casings 80, 95 respectively comprise a single-layered structure and a two-layered structure in which the second transparent or semitransparent layer is laminated on the first opaque, transparent or semitransparent layer. The recesses for the reverse side labelling area 88, 100 and the table-shaped projections 90, 102 for forming the front opening part are formed only by the first layer, while the tape-quantity observing window 89, 101, the tape-guiding roller windows 92a, 92b and the tape-running direction indicating cordingly, these parts have the single-layered structure. The other parts have the two-layered structure in which the second layer is laminated on the first layer. The opaque layer which constitutes the single-layered structure is formed by molding integrally with the opaque layer which constitutes the two-layered structure. Further, the transparent or semitransparent layer for the single-layered structure is formed by molding integrally with the transparent or semitransparent layer for the two-layered structure. The tape-quantity observing windows 89, 101, the tape-guiding roller windows 92a, 92b the tape-running direction indicating window 93 are formed to have the single-layered structure of the transparent or semitransparent layer so that the quantity of the magnetic tape and condition of tape running can be observed from the outside. In this case, it is preferable that the hub controlling ribs 104a, 104b are formed integrally with the tape-quantity observing window 101 as a transparent or semitransparent layer, or the tape-guiding roller shaft insertion hole 113 is formed in the transparent or semitransparent layer constituting each of the tape-guiding roller windows 92a, 92b.

Figure 1A:
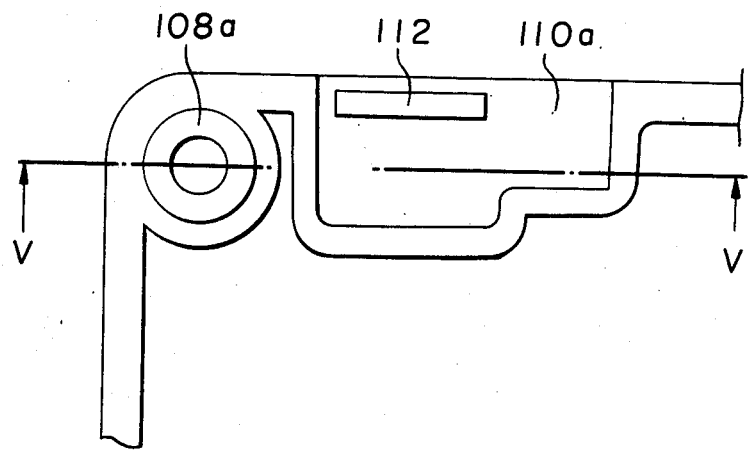
FIG. 1A is a plan view partly omitted of the inner surface of a lower half casing of an embodiment of the present invention.
Figure 1B:
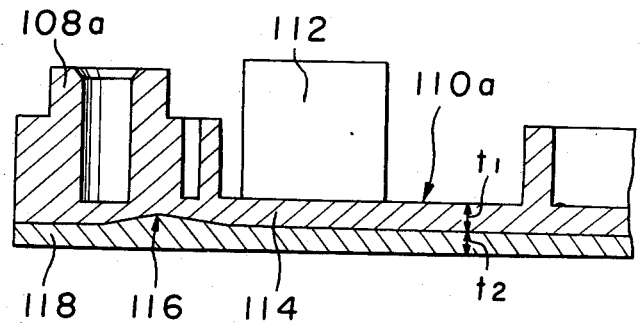
FIG. 1B is a cross-sectional view taken along a line V—V in FIG. 1A.
Figure 4:
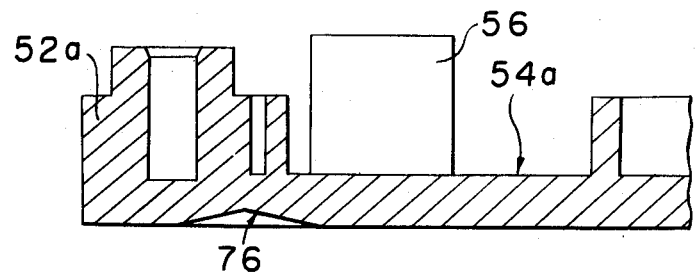
FIG. 4 is an enlarged cross-sectional view showing the left upper part of the lower half casing shown in FIG. 2B or FIG. 3B.

In FIG. 1 showing the upper left corner of the lower half casing in FIG. 7, in which FIG. 1A is a plan view and FIG. 1B is a cross-sectional view taken along a line V—V in FIG. 1, it is preferable that the thickness $t_1$ of the first layer 114 is substantially equal to the thickness $t_2$ of the second layer 118 to obtain requisite flatness and glossiness. The structure as shown in FIG. 1 is applied to the other three corners of the lower half casing 95. It is desired that in the single-layered structure consisting only of the first layer, the thickness of the first layer has substantially equal thickness. For instance, an inner surface area 120 of the lower half casing which corresponds to the recess for the reverse side labelling area 100 is recessed to have a thickness $t_3$ so as to be equal to the thickness $t_4$ of the other portion in the first layer. In this case, the thickness of the first layer is substantially equal to the thickness of the portion having the two-layered structure, whereby occurrence of a concave due to variation in thickness can be prevented.

In the upper half casing 80, the two-layered structure is also applied to the portions of screw fastening holes 83a to 83e at the four corners and the contiguous portions in which the second layer of the transparent or semitransparent layer is formed, by molding a material having high strength such as acrylonitrilestyrene resin, methacryl resin, polycarbonate resin and so on. Accordingly, the strength of thin-walled portions of the outer circumference in the range of about 90° including the curved portions 84a to 84d can be increased. Further, cracks caused when the molded product is removed from a metal mold and partial deformation of the casing due to a shock of dropping can be prevented.

The surface area on which a character for discriminating A or B surface is put, for instance, the surface area 91 for character A, which is a part of the single-layered structure formed only by the first layer may be substantially flush with the outer surface of the second layer. In this case, the surface area 91 is not covered when the second layer is laminated on the first layer whereby the character is easily readable.

Figure 9:
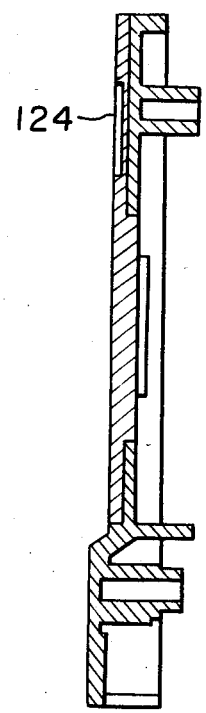
FIG. 9 is an enlarged cross-sectional view similar to FIG. 8, according to another embodiment of the present invention.

In the foregoing embodiment, the recess for the reverse side labelling area 100 is formed by the single-layered structure consisting only of the first layer. However, it is possible that as shown in FIG. 9, a recess for labelling area 124 is formed only in the reverse side in the two-layered structure, without forming the recess for labelling area at the front side.

As described above, in accordance with the present invention, a concave portion can be eliminated by forming the two-layered structure at the screw fastening portions and the portions near the four corners of the half casings. Accordingly, there is obtainable flatness of the half casings, an excellent tape-running properties, increase in glossiness of the surfaces of the casings. Further, a magnetic tape cassette having an excellent design can be easily prepared.

What is claimed is:

1. A magnetic tape cassette comprising upper and lower half casings wherein at least screw-fastening portions and their neighboring portions at four corners of said upper and lower half casings are formed by a two-layered structure consisting of a first layer whose visual characteristic is one of the group consisting of opaque, transparent and semitransparent, and a second layer whose visual characterictic is one of the group consisting of transparent and semitransparent, said second layer being laminated on said first layer in one piece.

2. A magnetic tape cassette according to claim 1, wherein tape-quantity observing windows in said half casings are formed by one of a transparent layer and a semitransparent layer.

3. A magnetic tape cassette according to claim 1, wherein tape-guiding roller windows in said half casings are formed by one of a transparent layer and a semitransparent layer.

4. A magnetic tape cassette according to claim 1, wherein tape-running direction, indicating windows in said half casings are formed by one of a transparent layer and a semitransparent layer.

5. A magnetic tape cassette according to claim 1, wherein a thickness of said first layer is substantially the same as that of said second layer.

6. A magnetic tape cassette according to Claim 1, wherein surface portions on which a character capable of discriminating either an A-surface or a B-surface is shown, which are formed by only said first layer, are substantially in the same level as the outer surface area.

7. A magnetic tape cassette according to claim 1, wherein in each of said upper and lower half casings, a part of the inner surface area formed by only said first layer is recessed so as to have substantially the same thickness as that of the other part of said first layer.

8. A magnetic tape cassette according to Claim 2, wherein at least one hub controlling rib is formed integrally with said layer constituting said tape-quantity observing windows.

9. A magnetic tape cassette according to claim 3, wherein recesess for receiving tape-guiding roller shafts are formed in said layer constituting said tape-guiding roller windows.

10. A magnetic tape cassette according to claim 1, wherein said upper and lower half casings respectively have a recess for a labelling area which is formed of a two-layered structure.

* * * * *